(12) United States Patent
Dorval Dion et al.

(10) Patent No.: US 12,172,217 B2
(45) Date of Patent: Dec. 24, 2024

(54) PLASMA APPARATUS FOR THE PRODUCTION OF HIGH QUALITY SPHERICAL POWDERS AT HIGH CAPACITY

(71) Applicant: PYROGENESIS CANADA INC., Montréal (CA)

(72) Inventors: Christopher Alex Dorval Dion, Montréal (CA); William Kreklewetz, Pointe Claire (CA); Pierre Carabin, Montréal (CA)

(73) Assignee: PYROGENESIS CANADA INC., Montréal (CA)

( * ) Notice: Subject to any disclaimer, the term of this patent is extended or adjusted under 35 U.S.C. 154(b) by 1031 days.

(21) Appl. No.: 15/579,693

(22) PCT Filed: Jun. 6, 2016

(86) PCT No.: PCT/CA2016/000165
§ 371 (c)(1),
(2) Date: Dec. 5, 2017

(87) PCT Pub. No.: WO2016/191854
PCT Pub. Date: Dec. 8, 2016

(65) Prior Publication Data
US 2018/0169763 A1    Jun. 21, 2018

Related U.S. Application Data

(60) Provisional application No. 62/171,618, filed on Jun. 5, 2015.

(51) Int. Cl.
*B22F 9/14*    (2006.01)
*B01J 2/04*    (2006.01)
(Continued)

(52) U.S. Cl.
CPC ............... *B22F 9/14* (2013.01); *B01J 2/04* (2013.01); *B22F 9/082* (2013.01); *B29B 9/10* (2013.01);
(Continued)

(58) Field of Classification Search
CPC .... B22F 9/14; B22F 9/082; B01J 2/04; B29B 9/10; C21D 9/60; C21D 9/68; H05H 1/42;
(Continued)

(56) References Cited

U.S. PATENT DOCUMENTS 2,675,461 A * 4/1954 Leonard ................. H05B 6/365
219/636
3,140,380 A * 7/1964 Jensen ..................... H05H 1/32
219/76.16
(Continued)

FOREIGN PATENT DOCUMENTS

CA    1269418      11/1988
CA    2538239 A1   3/2005
(Continued)

OTHER PUBLICATIONS

Verlinden B. and Froyen L., "Aluminium Powder Metallurgy," Training in Aluminium Application Technologies, vol. Advanced level 1, 1994.
(Continued)

*Primary Examiner* — Geoffrey S Evans
(74) *Attorney, Agent, or Firm* — Benoit & Côté Inc.; Michel Sofia

(57) ABSTRACT

An apparatus and a process for the production at high capacity of high purity powders from a wire using a combination of plasma torches and induction heating are disclosed. The process has good productivity by providing a preheating system. A mechanism is included in the apparatus, which allows adjusting the position of the plasma
(Continued)

torches and their angle of attack with respect to the wire, permitting to control the particle size distribution.

15 Claims, 3 Drawing Sheets

(51) Int. Cl.
| | |
|---|---|
| *B22F 9/08* | (2006.01) |
| *B29B 9/10* | (2006.01) |
| *C21D 9/60* | (2006.01) |
| *C21D 9/68* | (2006.01) |
| *H05H 1/42* | (2006.01) |
| *B29B 9/12* | (2006.01) |

(52) U.S. Cl.
CPC ............... *C21D 9/60* (2013.01); *C21D 9/68* (2013.01); *H05H 1/42* (2013.01); *B22F 2202/13* (2013.01); *B22F 2998/00* (2013.01); *B22F 2999/00* (2013.01); *B29B 2009/125* (2013.01); *Y02P 10/25* (2015.11)

(58) Field of Classification Search
CPC ... H05H 1/44; H05B 6/02; H05B 6/04; H05B 6/104
See application file for complete search history.

(56) References Cited

U.S. PATENT DOCUMENTS

| | | | | |
|---|---|---|---|---|
| 4,374,075 | A | * | 2/1983 | Yolton .................... B22F 9/082 264/10 |
| 4,408,971 | A | * | 10/1983 | Karinsky ................... B01J 2/04 425/8 |
| 4,427,874 | A | * | 1/1984 | Tabata .................... B23K 9/091 219/130.31 |
| 4,544,404 | A | | 10/1985 | Yolton et al. |
| 4,788,394 | A | * | 11/1988 | Vanneste ................... C21D 9/60 219/674 |
| 4,928,879 | A | * | 5/1990 | Rotolico ................. B05B 7/205 219/76.16 |
| 4,982,410 | A | | 1/1991 | Mustoe et al. |
| 5,084,091 | A | | 1/1992 | Yolton |
| 5,256,855 | A | * | 10/1993 | Heanley .................. C03B 19/01 219/121.38 |
| 5,294,242 | A | | 3/1994 | Zurecki et al. |
| 5,480,470 | A | | 1/1996 | Miller et al. |
| 5,529,292 | A | | 6/1996 | Accary |
| 5,548,611 | A | * | 8/1996 | Cusick .................... H05H 1/48 373/18 |
| 5,707,419 | A | * | 1/1998 | Tsantrizos ............. B01J 19/088 75/346 |
| 5,808,270 | A | | 9/1998 | Marantz et al. |
| 5,935,461 | A | | 8/1999 | Witherspoon et al. |
| 6,259,071 | B1 | * | 7/2001 | Demidovitch ..... G05D 23/1902 148/698 |
| 6,693,264 | B2 | | 2/2004 | Anderhuber et al. |
| 7,737,382 | B2 | * | 6/2010 | Blankenship ........ H05H 1/2406 219/121.11 |
| 2005/0133527 | A1 | | 6/2005 | Dullea et al. |
| 2006/0219709 | A1 | * | 10/2006 | Kagan ...................... H05B 6/04 219/661 |
| 2007/0026158 | A1 | * | 2/2007 | Molz ....................... C23C 4/131 427/446 |
| 2007/0113781 | A1 | * | 5/2007 | Lichtblau ................ C23C 4/129 118/620 |
| 2010/0059493 | A1 | * | 3/2010 | McAninch ........... B23K 26/147 219/137 PS |
| 2013/0011569 | A1 | * | 1/2013 | Schein .................... C23C 4/131 427/580 |
| 2014/0008354 | A1 | * | 1/2014 | Pletcher .................. H05B 6/02 219/602 |
| 2016/0175936 | A1 | * | 6/2016 | Boulos ...................... B22F 9/14 75/346 |
| 2016/0286611 | A1 | * | 9/2016 | Park ........................ B23K 3/063 |

FOREIGN PATENT DOCUMENTS

| | | | | |
|---|---|---|---|---|
| CA | 2551358 | A1 | * | 1/2007 ............ B05B 7/203 |
| CA | 2912282 | A1 | | 9/2015 |
| CN | 101801125 | | | 9/2012 |
| CN | 104475744 | | | 4/2015 |
| CN | 104493166 | | | 4/2015 |
| GB | 2226221 | | | 6/1990 |
| JP | 2001-181846 | | | 6/2002 |
| JP | 2005268050 | | | 9/2005 |
| JP | 5693249 | | | 4/2015 |
| WO | 1993002787 | | | 2/1993 |
| WO | 2005007334 | | | 1/2005 |
| WO | 2011054113 | | | 5/2011 |
| WO | 2011054113 | A1 | | 5/2011 |
| WO | WO-2013043156 | A1 | * | 3/2013 ............ B29C 45/72 |
| WO | 2015135075 | | | 9/2015 |

OTHER PUBLICATIONS

Pyrogenesis S.A., Injection Moulding of Titanium Powders for Biomedical Applications, BIOTIP, Oct. 2008 ("BIOTIP") Retrieved from http://cordis.europa.eu/result/rcn/46972_en_html.
Sumper A., Baggini, A. Electrical Energy Efficiency: Technologies and Applications, John Wiley & Sons, 2012, 550 p, ISBN: 9780470075510. p. 315-316 ("Electrical Energy Efficiency").
International Search Report and Written Opinion dated Oct. 14, 2016 in International Application No. PCT/CA2016/000165. (13 pages).
Patent Cooperation Treaty, Third Party Observation submitted Jun. 22, 2017 in International Application No. PCT/CA2016/000165. (6 pages).
Third Party Observations under Section 801 of the administrative instructions under the PCT submitted Jun. 22, 2017 in International Application No. PCT/CA2016/000165. (15 pages).
Pyrogenesis S.A., "Final Report—BIOTIP (Injection Moulding of Titanium Powders for Biomedical Applications)", Oct. 2008, pp. 1-22 (hereinafter "BIOTIP").
Sumper A. and Baggini, A., "Electrical Energy Efficiency: Technologies and Applications", John Wiley & Sons, LTD., The Atrium, Southern Gate, Chichester, West Sussex, PO198SQ, United Kingdom, 2012, ISBN: 978-0-470-97551-0, pp. 315-316 (hereinafter "Electrical Energy Efficiency").
Tao, Y et al., "Effect of PREP process parameters on powder properties for FGH95 superalloy", Journal of Iron and Steel Research (2003), 15(5), pp. 46-50 , publication date Oct. 2003.
Wikipedia extract on inductive heating, published on May 6, 2015.
"Chauffage par induction", Jean Callebaut, Laborelec, publié en août 2007 : publication date Aug. 2007.
Ober Induktionserwarmung, Ambrell induction heating solutions, published on Aug. 8, 2014.

\* cited by examiner

PLASMA APPARATUS FOR THE PRODUCTION OF HIGH QUALITY SPHERICAL POWDERS AT HIGH CAPACITY

CROSS REFERENCE TO RELATED APPLICATIONS

N/A

FIELD

The present invention relates to the production of high purity metallic powders for use in additive manufacturing and 3D printing machines.

BACKGROUND

There is a growing demand for fine high quality spherical metallic powders. For example, one major application for such powders is the 3D printing industry, which has been demanding for narrow size cuts of high quality spherical satellite-free Ti-6Al-4V (titanium alloy), of generally between 45 and 250 microns.

This application has raised the bar in terms of quality, as it consumes the highest quality of powders currently available on the market. Many criteria are used to rate the quality of a powder: its sphericity, its particle size distribution, the absence of satellites (significantly small particles that are attached to the main particles). One current problem is that the production capacity of such quality powder is very limited. Another one is that a typical atomization system produces a wide range of particle size, while the industry asks for very narrow and specific cuts.

Numerous methods have been developed over the last years to produce powders by atomization.

For example in U.S. Pat. No. 5,707,419, a method is disclosed whereby plasma torches are used to melt and atomize a titanium wire. In this disclosure, the feed rate for example for titanium is limited to 14.7 g/min and the plasma torches are fixed in position at a 30° angle with respect to the axis of the feed. This 30° angle had been determined as being the optimal angle under certain circumstances. Here, the torches are locked at this specific angle to insure the alignment with the wire. While this method has the advantage of repeatability between runs, as well as minimizing the chances of aiming beside the wire, Applicant's experience demonstrates that this configuration is not optimal. It has been demonstrated that the ideal angle varies with the wire speed as well as the desired particle size distribution.

In PCT Patent Publication No. WO 2011/054113, a method is proposed to improve productivity of the plasma atomization using electrodes for preheating. Using electrodes for preheating is a very complicated process. In this arrangement, there are typically (3) electrodes as well as three (3) plasma torches to ensure a uniform heating. The wire is heated by arcing each electrode to the wire. Therefore, 3 currents are passing through the wire and heat it by resistive heating. This means that 6 power supplies are required to operate, noting that the more power sources there are, the more difficult it is to manage the heat going to the wire, in addition to this also increasing the capital and operating cost significantly.

There are also a number of mechanical inconvenients to this arrangement. For example, for plasma atomization to take place, the torch alignment according to the wire is very critical. All the electrodes and the torches, as well as the wire, must converge at the same exact point. The space around the apex convergence point being very limited, the design of the assembly is therefore dictated by mechanical constraints rather than by the process itself.

Therefore, it would be desirable to have a simplified device to allow for increasing the productivity of plasma atomization. There would also thus be a gain in having a system that allows controlling the particle size distribution.

SUMMARY

It would thus be highly desirable to provide a novel apparatus for producing quality powders.

The embodiments described herein provide in one aspect an apparatus to produce metallic powder from a wire by plasma atomization, comprising:
  a device for preheating the wire;
  at least one plasma torch for heating the wire to atomization; and
  a chamber for cooling atomized particles to solid state.

Also, the embodiments described herein provide in another aspect an apparatus to produce metallic powder from a wire by plasma atomization, comprising:
  plasma torches for atomizing the wire, the plasma torches being adapted to swivel and rotate on a reactor; and
  a chamber for cooling atomized particles to solid state.

Furthermore, the embodiments described herein provide in another aspect an apparatus to produce metallic powder from a wire by plasma atomization, comprising:
  plasma torches for atomizing the wire, the angle of the plasma torches with the wire being adapted to be adjusted for adjusting powder particle size distribution; and
  a chamber for cooling atomized particles to solid state.

Furthermore, the embodiments described herein provide in another aspect a method to produce metallic powder from a wire by plasma atomization, comprising:
  preheating the wire;
  heating the wire to atomization; and
  cooling atomized particles to solid state.

Furthermore, the embodiments described herein provide in another aspect a method to produce metallic powder from a wire by plasma atomization, comprising:
  providing plasma torches, the plasma torches being adapted to swivel and rotate on a reactor;
  adjusting the position of the plasma torches on the reactor;
  using the plasma torches for atomizing the wire; and
  cooling atomized particles to solid state.

Furthermore, the embodiments described herein provide in another aspect a method to produce metallic powder from a wire by plasma atomization, comprising:
  providing plasma torches for atomizing the wire,
  adjusting the angle of the plasma torches with respect to the wire for adjusting powder particle size distribution;
  using the plasma torches for atomizing the wire; and
  cooling atomized particles to solid state.

Furthermore, the embodiments described herein provide in another aspect a powder produced by any of the above methods.

Furthermore, the embodiments described herein provide in another aspect a powder produced by any of the above apparatuses.

BRIEF DESCRIPTION OF THE DRAWINGS

For a better understanding of the embodiments described herein and to show more clearly how they may be carried into effect, reference will now be made, by way of example only, to the accompanying drawings, which show at least one exemplary embodiment, and in which.

DESCRIPTIVE OF VARIOUS EMBODIMENTS

In order to produce high quality powders, controlling particle size and maximizing production rate in a plasma atomization reactor, an apparatus P and a method by which torch angle can be adjusted and wire preheated are hereby presented.

Figure 1:
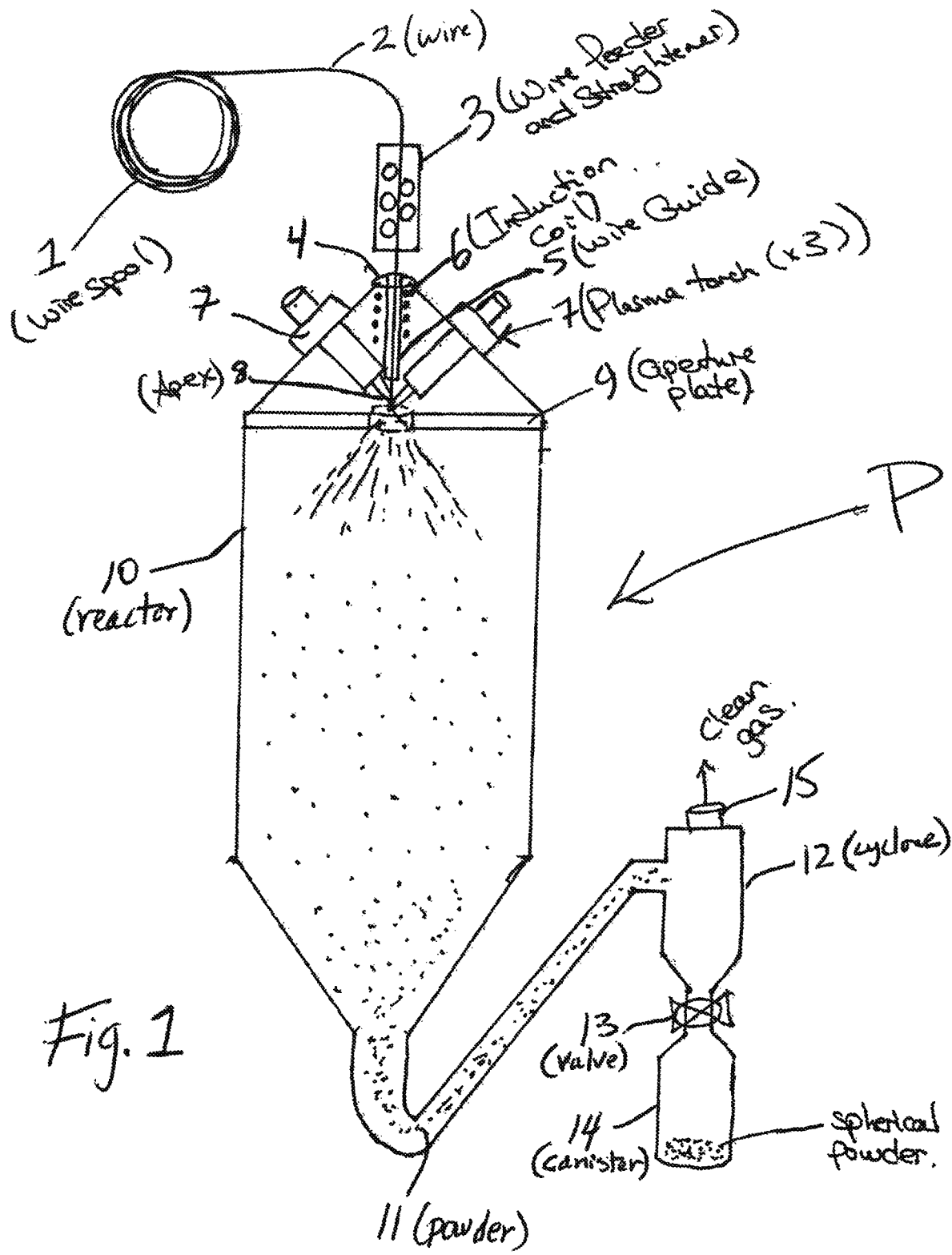
FIG. 1 is a general schematic representation of a plasma apparatus in accordance with an exemplary embodiment.

As illustrated in FIG. 1, a wire 2 provided on a metallic wire spool 1 is uncoiled therefrom and is then fed through a wire feeder and straightener 3. The straight wire 2 is fed through a pass-through flange 4. Then, the wire 2 enters into a wire guide 5 that is surrounded by an induction coil 6, prior to being atomized by three plasma torches 7 at the apex 8 thereof (the apex being the meeting point of the wire 2 and the three torches 7). The powder so produced passes through an aperture plate 9 and cools down as it falls down a reactor 10.

Once preheated, the wire 2 then reaches the apex 8, which is the zone where the wire 2 and the three plasma torches 7 meet for the atomization. The melting atomized particles freeze back to solid state as they fall down into a chamber of the reactor 10. The powder 11 is then pneumatically conveyed to a cyclone 12. The cyclone 12 separates the powder from its gas phase. The powder is collected at the bottom of a canister 14 while clean gas is then sent, via outlet 15, to a finer filtering system (not shown). The canister 14 can be isolated from the cyclone 12 by a gas-tight isolation valve 13.

Now turning our attention to the induction coil 6, the current apparatus P uses an induction coil to preheat the wire, which uses a single power supply and as the heat source does not encumber the apex zone. In this configuration, the wire preheating comes from a single uniform and compact source. Wire temperature can be controlled by adjusting induction power, which is a function of the current in the induction coil 6.

Figure 2:
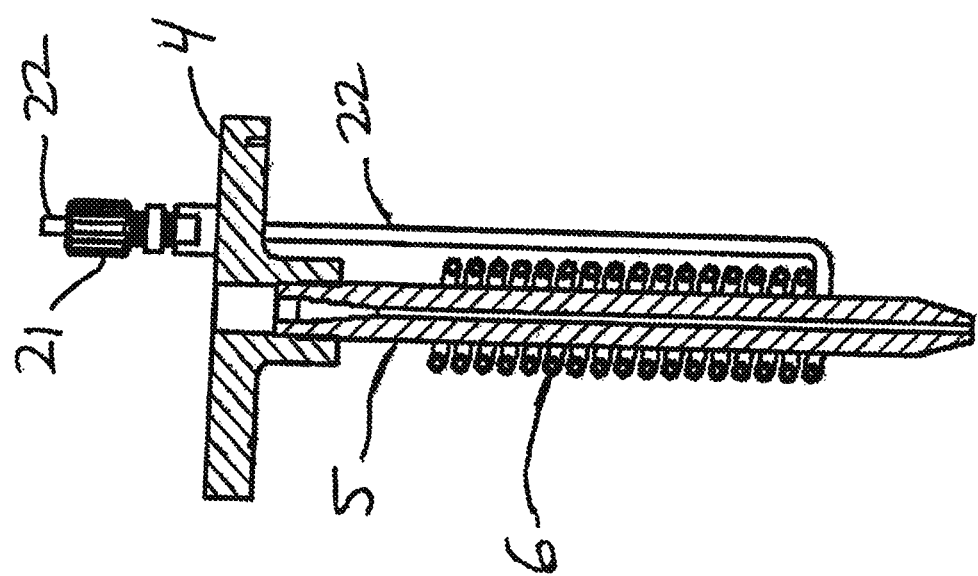
FIG. 2 is an enlarged detailed cross-sectional view of an induction coil and wire guide in accordance with an exemplary embodiment.

The induction preheating device is illustrated in FIG. 2. The pass-through flange 4 is made of a non electrically conductive material to ensure that the whole reactor is insulated from the coil. The pass-through flange 4 has two gas-tight holes equipped with compression fittings 21 used for passing the leads 22 of the induction coil 6 into the reactor 10.

The wire guide 5 can be designed to either react with or to be transparent to induction. For example, the wire guide 5 could be made of alumina, or silicon nitride, which are transparent to induction. It could also be made of silicon carbide or graphite, which react with induction. In the latter case, the hot wire guide, heated by induction, will radiate heat back into the wire 2.

For example, when the wire used was a ⅛" diameter Ti-6Al-4V Grade 23 ELI, the optimal induction frequency for this wire has been found to be between 270 and 290 kHz. The optimum frequency varies with the materials as well as the shape and dimension.

It is known that wire preheating can contribute to a capacity increase. However, the wire cannot be heated higher than its melting point in order to keep it under its solid state. Also, above a temperature of 1000° C., the alloy will convert from α to β phase, which will alter the rigidity of the wire. Depending on the configuration and the distance to be run by the wire, one might choose to maintain the mechanical properties of the wire of its a phase in order to keep the wire stiff and straight. For example, for a ⅛ " diameter Ti-6Al-4V Grade 23 ELI, since the wire shall not be brought higher than its melting point prior to atomization by plasma, the maximum capacity increase provided by wire preheating is 2 kg/h. This is equivalent to a capacity increase by a factor of three to four compared to a system without preheating.

Figure 3:
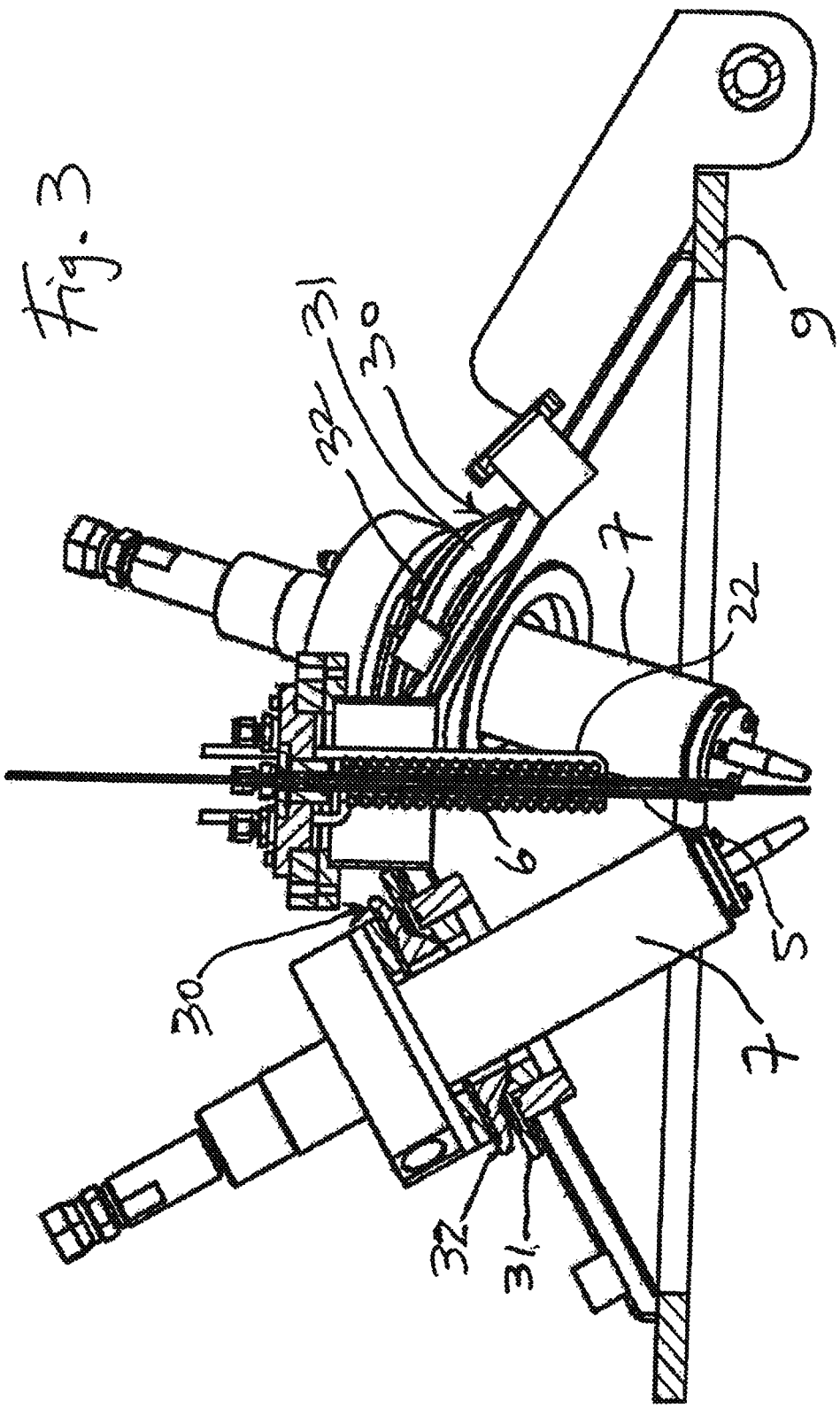
FIG. 3 is an enlarged detailed cross-sectional view of a torch angle adjustment mechanism using ball flanges in accordance with an exemplary embodiment.

FIG. 3 illustrates an adjustable torch angle mechanism, which includes swivelling ball flanges 30. The three plasma torches 7 are used to atomize the wire 2. These three torches 7 are herein attached to the body of the reactor head using swivelling bail flanges. The ball flanges 30 each include 2 flanges that fit into each other, namely a bottom flange 31 and an upper flange 32, which can swivel in accordance to each other. The bottom flange 31 that is connected to the reactor head is fixed, while the upper flange 32 can rotate up to an angle of 4° in every axis. Assuming the reactor head has been designed to have a nominal angle of 30°, this means that the torches 7 could cover any angle between 26° and 34°.

As varying the torch angle in relation to the wire 2 will also move the location of the apex 8 (the meeting point of the wire 2 and the three torches 7), this will have an effect on efficiency since the torches 7 have a constant length. In order to avoid such problem, longer torches coupled with spacers can be used. By having longer torches and multiple sizes of spacers, it is possible to attain any angle while keeping the location of the apex 8 at the same place.

Pivoting the torches 7 seems to have an important effect on the plasma atomization process. Prior systems stated that the optimal angle was to be fixed at 30°. Although one could have been tempted to doubt this statement, being able to swivel the torches was not an obvious alternative. Therefore, going with a fixed angle was justified in the case of previous systems. The present arrangement suggests giving flexibility to the system by adding swiveling ball flanges 30 to the design.

Varying the angle of attack between the wire 2 and the plasma jets can affect the atomization in several ways. The major difference between plasma atomization in regards to traditional gas atomization is that heat is supplied by the jet. Therefore, there are two major considerations to take into account; namely heat transfer from the torch 7 to the wire 2, and the atomization by itself.

An important aspect for plasma atomization is the quality of heat transfer between the torches and the wire. Indeed, a proper alignment is required. The angle of attack also has an effect on the heat transfer, in two different ways; steeper (or smaller) the angle is, the surface area (A) that will exchange heat will increase. On the other hand, a shallower (higher) angle will promote a higher exchange coefficient (h).

$$Q = hA\Delta T$$

where: Q is the heat transferred;
  h is the heat transfer coefficient;
  A is the surface area used for exchange; and
  $\Delta T$ is the temperature difference between the wire and the torch.

The equation above is a classic heat transfer formula. The objective is to maximize the value of Q. The angle will have an effect on both the h and the A. From a heat transfer point of view, the optimal angle is the one that maximizes Q for a specific wire feed rate, size and material.

For atomization to occur, some micro droplets must form at the surface of the wire 2 (heating phase). Then a gas flow is used to detach that droplet from the wire 2 and carry it in suspension into the gas phase (atomization phase). It is known that high velocities are required to break the bond between the wire and the droplet. The following equation, taken from water atomization of aluminum literature [5], relates the mean particle size to angle between the melt stream and the argon jet:

$$D = C/V \sin \alpha$$

where: V is the plasma jet velocity;
C is a global constant regrouping the different parameters and conditions; and
$\alpha$ is the angle between the melt stream and the plasma jet.

Although the application is slightly different, the concept is similar; the plasma jets herein replace the water jets and the jets are herein used for heating instead of cooling. Indeed, the formula shows that higher gas velocities are able to detach finer particles, which makes sense as it requires more force to detach a finer droplet from a melting wire. Interestingly, the angle seems to have a similar effect according to this formula.

It becomes clearer that in order to optimize the plasma atomization process, the angle has to be variable in order to adapt to different conditions. The two previous equations have shown how the parameters are intertwined, and that being able to vary the angles constitutes a significant feature of the present apparatus P.

The apparatus P thus includes inter alia (1) an inductive preheating of the wire to increase capacity; and (2) torches that are installed onto the reactor head, using swivelling ball flanges 30 which allow flexibility in regards to the angles that can be reached by the torch alignment, to allow for controlling particle size distribution (powder quality).

While the above description provides examples of the embodiments, it will be appreciated that some features and/or functions of the described embodiments are susceptible to modification without departing from the spirit and principles of operation of the described embodiments. Accordingly, what has been described above has been intended to be illustrative of the embodiments and non-limiting, and it will be understood by persons skilled in the art that other variants and modifications may be made without departing from the scope of the embodiments as defined in the claims appended hereto.

REFERENCES

[1] P. G. Tsantrizos, F. Allaire and M. Entezarian, "Method of production of metal and ceramic powders by plasma atomization". U.S. Pat. No. 5,707,419 A, 13 Jan. 1998.
[2] C. F. Yolton and J. H. Moll, "Method for Atomizing Titanium". U.S. Pat. No. 4,544,404, 12 Mar. 1985.
[3] M. Drouet, "Methods and Apparatuses for Preparing Spheroidal Powders". Patent application WO2011054113, 12 Apr. 2011.
[4] C. F. Yolton, "Induction melting titanium in a vacuum or nonoxidzing atmosphere and treatment of an electric current". U.S. Pat. No. 5,084,091A, 28 Jan. 1992.
[5] B. Verlinden and L. Froyen, "Aluminium Powder Metallurgy," Training in Aluminium Application Technologies, vol. Advanced level 1, 1994.

The invention claimed is:

1. An apparatus to produce powder from a wire by plasma atomization, comprising:
a device for preheating the wire;
at least one plasma torch for heating the wire to atomization; and
a chamber for cooling atomized particles to solid state,
wherein the device for preheating the wire includes an induction coil.

2. The apparatus of claim 1, wherein there is provided a wire guide for coupling with induction to transfer heat to the wire.

3. The apparatus of claim 2, wherein, if the wire is electrically conductive, the wire is also heated by direct coupling at the same time as it is heated by the wire guide.

4. The apparatus of claim 2, wherein heat is adapted to be transferred to the wire by at least one of conduction, radiation and convection.

5. The apparatus of claim 1, wherein there is provided a system for adjusting at least one of an angle and a distance of the torch with respect to the wire.

6. The apparatus of claim 1, wherein there is provided a feeding device upstream of the device for preheating the wire.

7. The apparatus of claim 6, wherein the feeding device is adapted to straighten the rods and wires.

8. The apparatus of claim 1, wherein the wire diameters are between ⅛" and 6" inclusively.

9. The apparatus of claim 1, wherein a wire guide is provided interiorly of the induction coil.

10. An apparatus to produce powder from a wire by plasma atomization, comprising:
a device for preheating the wire;
at least one plasma torch for heating the wire to atomization; and
a chamber for cooling atomized particles to solid state,
wherein the device for preheating the wire includes an induction coil,
and wherein there is provided a wire guide that is transparent to induction, whereby heat from the induction coil is transferred directly to the wire.

11. The apparatus of claim 10, wherein there is provided a system for adjusting at least one of an angle and a distance of the torch with respect to the wire.

12. The apparatus of claim 10, wherein there is provided a feeding device upstream of the device for preheating the wire, the feeding device being adapted to accommodate rods and wires of various diameters.

13. The apparatus of claim 12, wherein the feeding device is adapted to straighten the rods and wires.

14. The apparatus of claim 10, wherein the wire diameters are between ⅛" and 6" inclusively.

15. The apparatus of claim 10, wherein a wire guide is provided interiorly of the induction coil.

\* \* \* \* \*